United States Patent [19]

Ensor

[11] 4,095,835
[45] Jun. 20, 1978

[54] FLOW-NOSE DEPLOYABLE STREAMLINING FOR VEHICLES

[76] Inventor: John E. Ensor, 1409 Mt. Carmel Rd., Parkton, Md. 21120

[21] Appl. No.: 815,597

[22] Filed: Jul. 14, 1977

[51] Int. Cl.² .............................................. B62D 35/00
[52] U.S. Cl. .................................... 296/1 S; 105/2 R; 180/1 FV; 296/91
[58] Field of Search .................. 296/1 S, 91; 105/2 R, 105/2 A; 180/1 FV

[56] References Cited

U.S. PATENT DOCUMENTS

| | | | |
|---|---|---|---|
| 2,036,560 | 4/1936 | Backus | 296/1 S |
| 3,695,674 | 10/1972 | Baker | 296/1 S |
| 3,762,758 | 10/1973 | Wilkerson | 296/1 S |
| 3,791,468 | 2/1974 | Bryan, Jr. | 296/1 S |
| 3,929,369 | 12/1975 | Blair | 296/1 S |
| 3,971,586 | 7/1976 | Saunders | 296/1 S |
| 3,972,494 | 8/1976 | Drews | 296/91 |

*Primary Examiner*—Richard A. Bertsch
*Attorney, Agent, or Firm*—John F. McClellan, Sr.

[57] ABSTRACT

An energy-saving streamlining structure for the fronts of motor trucks, motor homes, buses and the like, comprises when deployed a forward-pointing transparent conical shell supported on the front of a truck by a stem generally axial to the shell; telescoping and rotary linkages of the stem fold the shell into damage resistant horizontal opposed-segment or bow-tie storage-configuration compactly retracted against the front of the vehicle. Transparent panels provide driver-view of the highway through the unit, anti-shake spring biasing stabilizes the mechanism when deployed, and power drive provides for remote control operation from the truck cab at all times. Compactness and integration of the parts adapt the unit for after-market attachment and capability for transfer from one vehicle to another as well as for installation as original equipment at the factory; in an embodiment provision is made for the invention when deployed to return to storage mode when the vehicle reduces speed to a predetermined rate.

25 Claims, 7 Drawing Figures

FLOW-NOSE DEPLOYABLE STREAMLINING FOR VEHICLES

This invention relates generally to motor vehicles and specifically to motor vehicle streamlining.

A principal object of the present invention is to provide a deployable vehicle-front streamlining apparatus which will substantially and safely increase vehicle efficiency in highway operation, effecting very substantial fuel saving while interfering to the least possible extent in close-quarter maneuvering or other operations of the vehicle.

In the prior art numerous devices have been disclosed for streamlining or similar operations as exemplified by the following U.S. Pats. Nos.;

3,762,758 to G. C. Wilkerson, Oct. 2, 1973, discloses a front-mounted hollow airfoil (also usuable as a storage container).

3,682,777 to W. P. Schifano, Oct. 28, 1975, discloses a wind deflector for flat-front vehicles;

3,971,586 to W. S. Saunders, July 27, 1976, discloses streamlining means for reducing drag in land vehicles;

3,972,494 to H. F. P. Drews Aug. 3, 1976, discloses a foward projection for reducing drag in vehicles by expelling fluid laterally;

3,977,716 to D. M. Whited, Aug. 31, 1976, discloses wind deflector structure with powered means for extending or retracting.

However, none of these devices is believed to make fair suggestion of the present invention or to offer the advantageous structural or operational features of it as set out herein.

Further objects are to provide apparatus of the type described which is quickly adjustable in forward deployment and in retraction, which is shake-resistant at all normal speeds of operation, which permits good forward view, which can yield on impact more safely than fixed structure, which tends to deflect snow, smoke, insects, water, and particles and similar light weight material from impingement on the vehicle to which the invention is attached; and which is durable, economical, easy to install and to operate, and pleasing in appearance.

In brief summary given for purposes of cursive description only and not as limitation, the invention includes a circumferentially foldable/unfoldable axially extensible generally conical-contour deflector mechanism for reducing fuel consumption in vehicles.

The above and other objects and advantages of this invention will become more readily understandable on examination of the following description, including the drawings in which like reference numerals refer to like parts.

Although the invention is illustrated in use with truck type vehicles, it will be appreciated that it is as easily applicable to other motor vehicles including motor homes, buses, and the like.

FIG. 1 shows the invention 10 in returned or stored mode in installation on a motor truck such as a tractor-trailer rig T, supported to the vehicle by telescoping stem 20. The stem may fasten at a point above the vehicle radiator R and below the vehicle windshield W and extend forward in a generally horizontal direction, as along the longitudinal centerline of the vehicle.

A shell or shield 22 is formed by a plurality of triangular vanes or panels 24, each attached at the apex to the stem. In the stored mode shown these overlie each other in two groups diametrically opposed forming a compact horizontal bow-tie shaped array held against the front of the vehicle between the vehicle windshield and the radiator. 46 is a support described later.

Figure 1:
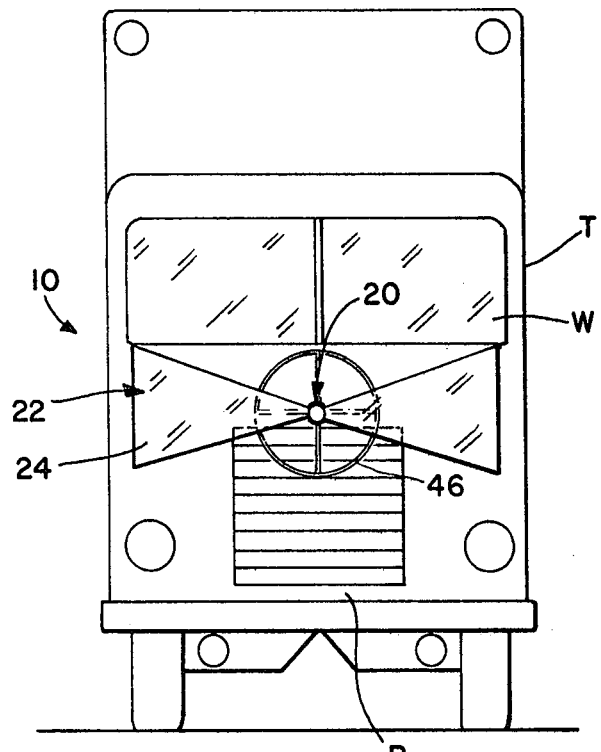
FIG. 1 is a front elevational view of the invention in stored mode on a vehicle.
Figure 2:
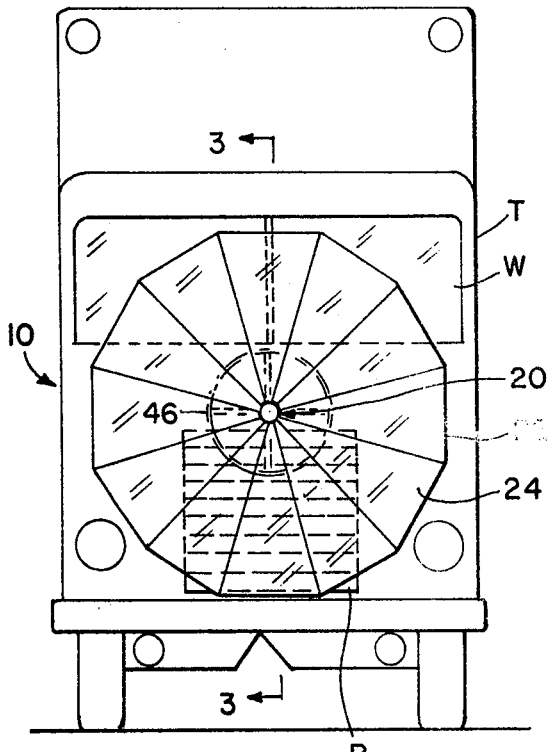
FIG. 2 is a front elevational view of the invention in deployed mode in use on a vehicle.

FIG. 2 shows the invention unfolded circumferentially into full conical shape forwardly extended from the vehicle, by the stem, in deployed mode.

The panels are transparent where necessary for vision and illumination, at least, permitting them to rise over a portion of the vehicle windshield without obstructing the view. In smaller embodiment the vehicle operator could see over the top of the unit, making transparency unnecessary. In either event, the circular configuration can provide reasonable headlight clearance.

Figure 3:
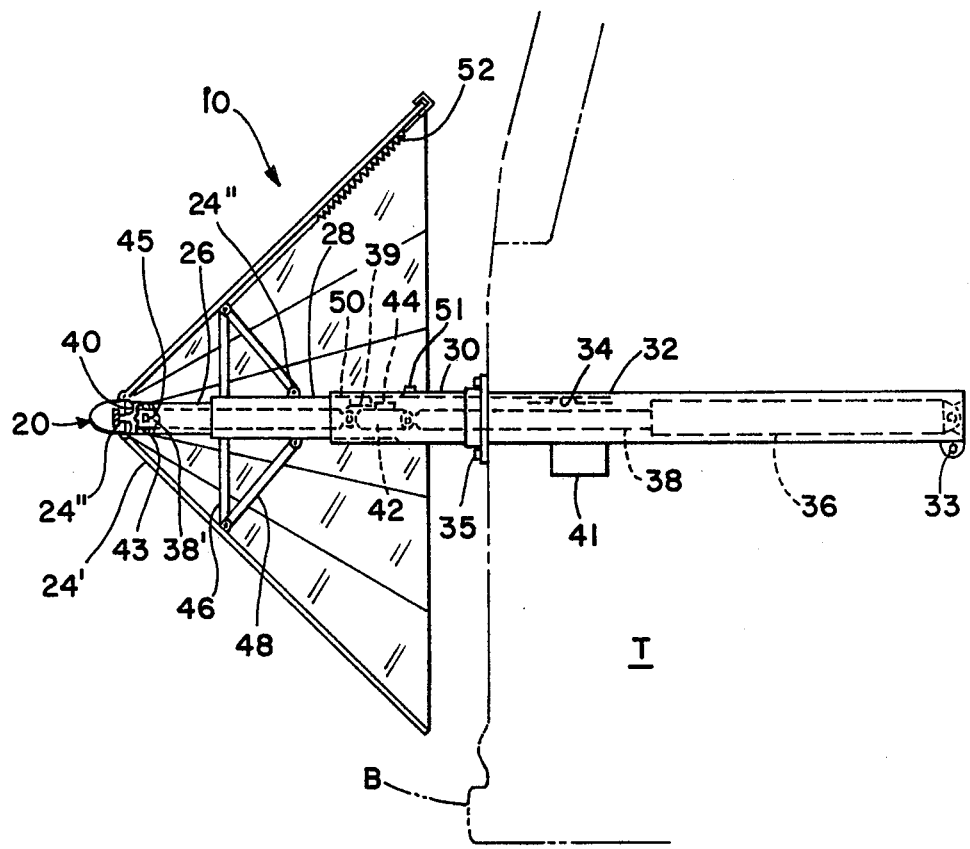
FIG. 3 is a side elevational view taken at 3—3, FIG. 2.

FIG. 3 shows in partial section a diagrammatical installation-view on a vehicle T.

The stem 20, shown fully extended may comprise four tubular successively telescoping structural elements 26, 28, 30, 32 from second to first end, having internal key or spline structure typically as at 34 so that they do not rotate. The largest telescoping element serves as the mount, extending forwardly from secure affixation 33 within the interior, to the exterior of the vehicle, to which it is fixed as by bolt-and-flange attachment 35.

The extension-retraction actuator may be of any conventional type, representad by hydraulic ram 36, the arm 38, 38' of which extends forwardly through the interior of the stem to the location of the inner ends of the panels, which it carries. The moving panels 24' protrude outwardly through two long circumferential slots 40 in the leading telescoping element 26, to which the lateral two of the panels, the static panels 24" are affixed so that they always remain in horizontally opposed position relative to each other. Arm engagement with the front telescoping element 26 may be between the panels and the slot structure or by any conventional means such as a circumferential key way 43 engaged by a key 45 on the arm. When the stem extends, rotation of the actuator arm unfolds the moving panels in two sets like Japanese fans to form the deployed conical array or shell, one set unfolding up and over from one of the fixed panels and the other set unfolding down and under from the other of the fixed panels, by means described later.

Rotation of the actuator arm to accomplish the panel unfolding and folding may be by any conventional means, such as by means of a microswitch 39 energizing any suitable convention circuit represented by box 41 to energize electric motor 42, shown in the arm linkage and having key 44 or other sliding engagement with the interior of the telescoping structure; the key may depress and release the microswitch to accomplish the folding and unfolding. As another example the unfolding and folding may be done by means of a fast thread in the interior of the telescoping structure, to which the arm may be keyed.

The means by which the panels yield for folding and unfolding is explained in more detail later. Brace structure or ring 46 symmertrically held by struts 48 to element 28 against the back surface of the shell supports it at the proper conical angle which may be 90° included. As the stem retracts, it alters the cone angle by forcing the folded panels into shallowerangle configuration for storage, forcing progressively shorter radii of the panels against the fixed-diameter ring. When the stem retracts the inner ends of the struts pass into recesses 50 along element 30 until stopped in position for changing the panel angle, as by contact of a suitable lug 51 with the mounting bracket, for example, to position the recess ends for stopping the struts.

In both the deployed and the retracted positions tension springs 52 between the panel outer ends and the ring hold the panels secure against rattling. In this view it can be seen that when deployed the shell can be spaced from the vehicle at a distance no more than one or two times greater than the average vehicle bumper B protrusion distance and still streamline airflow from road-clearance height of the vehicle to nearly the top of the cab. Good engine ventilation is preserved by the gap between the front of the vehicle and the shell deployed in front, the circularity of the shell in front elevation permitting air to be fan-drawn almost directly into portions of the radiator.

Figure 4:
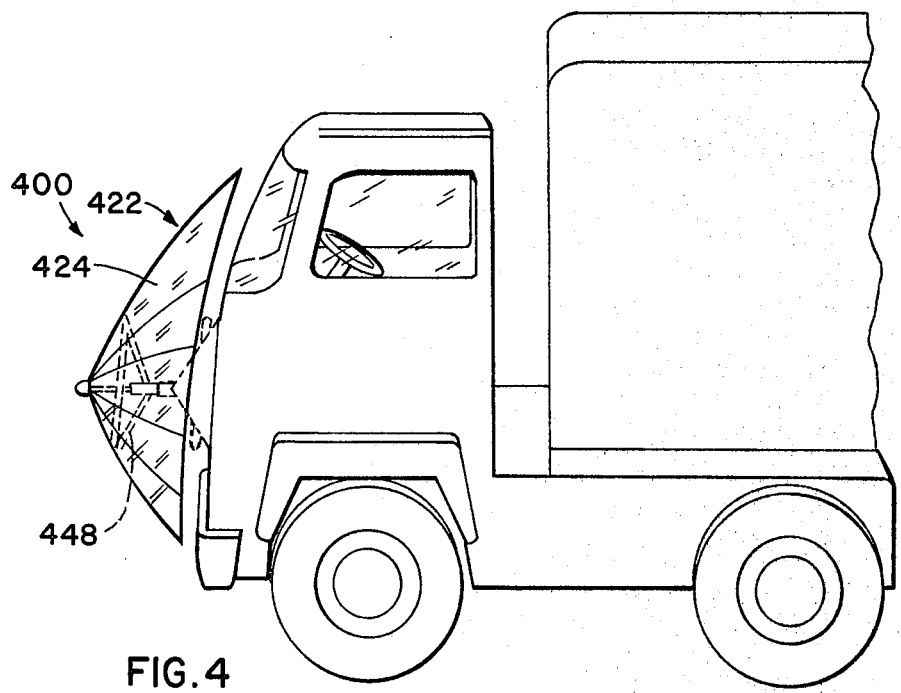
FIG. 4 is an alternative embodiment viewed from the side and slightly above.

FIG. 4 shows an alternative embodiment 400 in which the shell 422 is asymmetrical, as to provide extra shielding at the top and greater cooling at the bottom for the vehicle engine. A further feature apparent is that the axis of the shell may be made tipped relative to the stem axis, providing a further airflow adjustment, by making the supporting ring struts 448 longer at the bottom and shorter at the top.

Also, the individual panels 424 may, as shown, be forwardly convex for additional stiffness and smoother airflow, if desired.

Finally, in this Figure the phantom lines indicate the folded position, which may be asymmetrical, if the shell is made asymmetrical from top to bottom.

Figure 5:
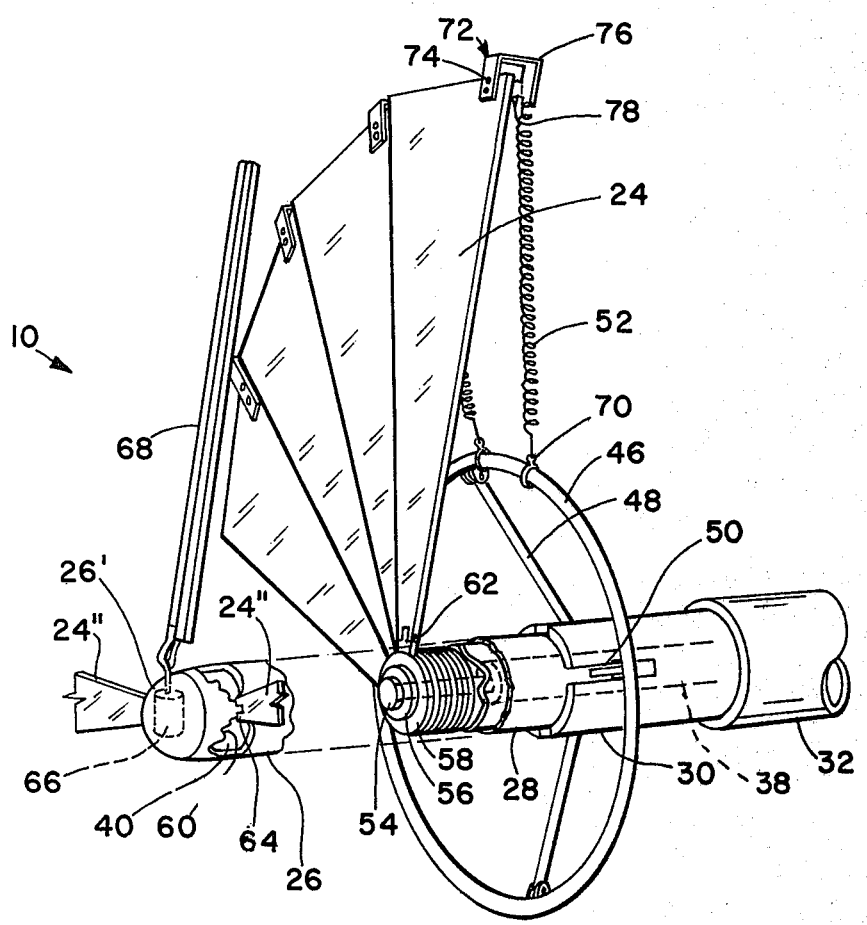
FIG. 5 is a partially exploded fragmentary detail.

FIG. 5 diagrams details of the structure at the forward end of the invention, showing the tubular members or telescoping elements 26, 28, 30 and 32 and the recesses 50 in element 30 for passing the struts 48 supporting ring 46.

The moving panels mount as follows. The forward end of hydraulic ram arm 38 may have a tapped hole receiving coaxially a bolt 54, with preferably a resilient washer 56 under the bolt head.

Each moving panel has a perforate friction plate 58 at the inner end; all the friction plates are secured under sliding frictional adjustment force by the bolt to the arm so that when the arm rotates the moving panels rotate with it until stopped. Offset of the moving panels, which overlap, is matched by offsets 60 in the circumferential slots 40 in the front end of element 26, so that as each panel reaches proper unfolded position it is stopped by an offset. As an alternative, any other suitable conventional means may be used for the purpose, such as linking the panels with small chains or lines.

Each panel has adjacent the inner end a pivot 62 tangential to the stem axis, permitting fore-and-aft motion of the panels, including the two fixed panels 24" which have similar pivotal attachment 64 to the front telescoping element 26. It is evident that adjacent pivots of the moving panels may be on successively longer radii if desired for extra clearance or that panel flexibility can be employed to provide the necessary fore-and-aft yielding for angle changing. The panels may be of methyl methracrylate resin or other suitable thermoplastic or the like.

The nosecap 26' on the front of the assembly may contain a windshield wiper oscillator motor 66 with one or more pivoted and spring windshield wiper blades 68 for wiping selected panels. It is evident that in the "off" position the blades can be biasable by folding and unfolding motions of the panels and repositionable exactly by the wiper motor when "on".

Also detailed in this Figure are the springs 52 and securances which normally (not in this partially exploded view) hold the panels against the supporting ring 46, to which the springs attach by sliding loops 70.

The upper ends of the springs attach to the panels by respective clips, so-positioned and dimensioned that there is no interference on folding, as follows. The outermost panel of each set of moving panels has a clip 72 attached at the top, near the edge which trails when folding, by rivets or the like 74. The clip may be inverted square "U"-shaped (shown exaggerated for emphasis) and has height clearance, and axial extent 76 sufficient to span and clear all the other panels when folded. Preferably the free end has an outwardly tapered resilient circumferential extension 78 for gathering and springing together, and to a fixed panel, all the other panels of the set in folded position.

Each of the remaining panels has an "L" shaped springattaching clip extending high enough to clear the other panels. These successive panels have the clips successively located further from the edge which trails in folding to provide clip-to-clip clearance when folded, as shown. The springs slide around on the ring until they strike a strut and then further stretch. If desired, it is evident that fewer struts can be employed without unduly weakening the support.

Figure 6:
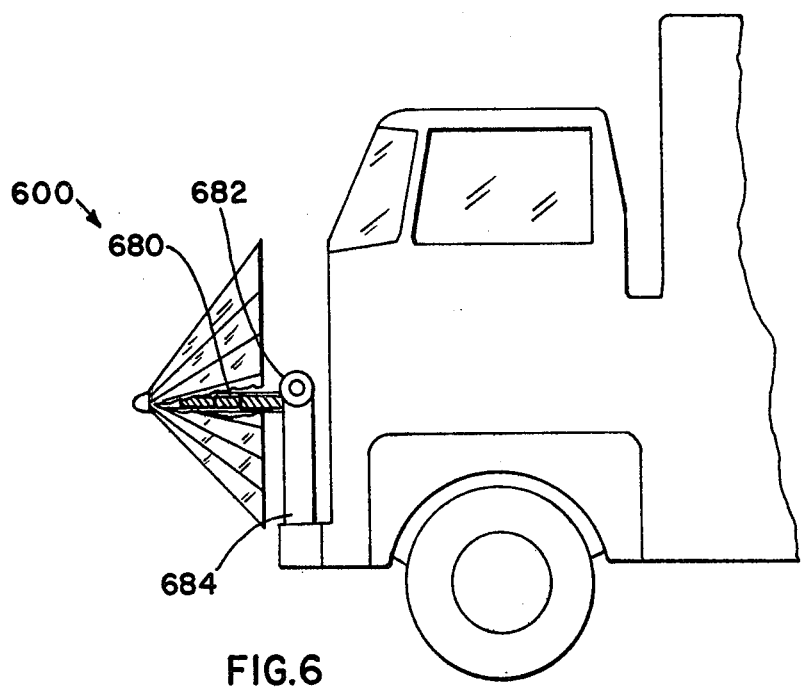
FIG. 6 is an alternative embodiment viewed as in FIG. 3.

FIG. 6 shows that the entire invention in suitable embodiment 600 can easily be bumper-mounted, and is readily adapted for other means of actuation, such as by telescopingscrews 680 within the telescoping tubes, driven by an electric motor 682, the entire assembly being supported by a pedestal 684 fixed at right angles to the stem.

Figure 7:
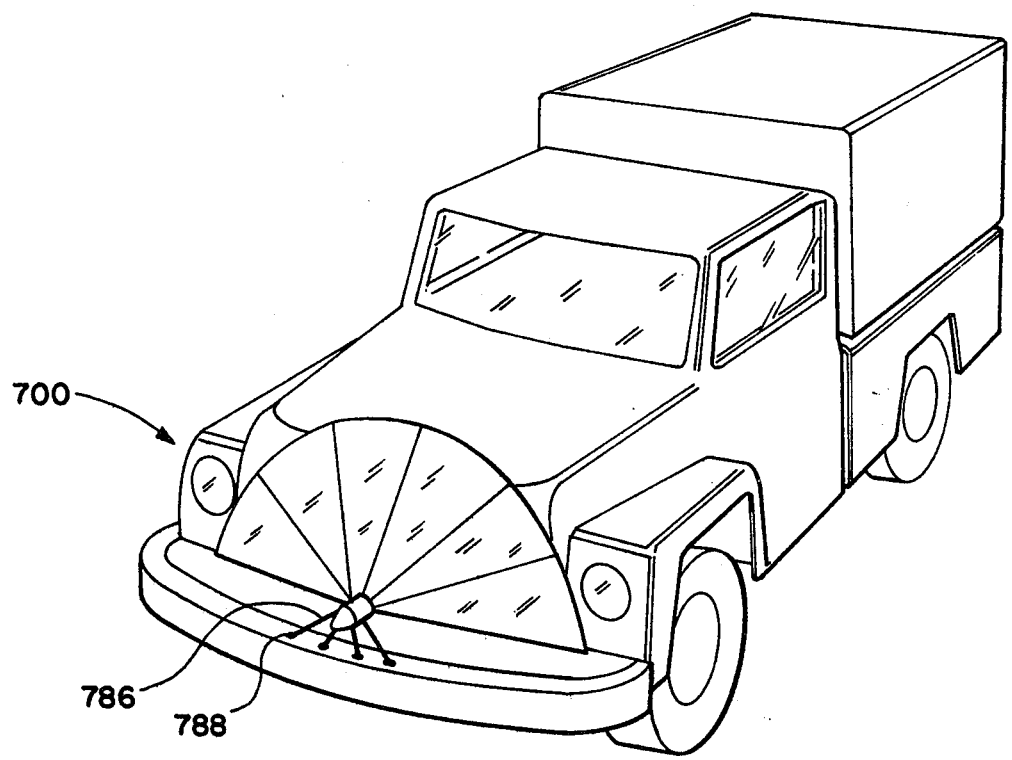
FIG. 7 is an isometric view of an embodiment of the invention on a vehicle.

FIG. 7 shows an embodiment 700 in the form of a halfcone, suitable for smaller vehicle use; mounting means may comprise bumper brackets 786 and fastenings 788; bolts, shackles, suction cups and the like being useful for the purpose. Because of the compactness and the relation to the truck contour this embodiment can be used merely by unfolding and refolding like a fan if desired, without fore-and-aft extension and retraction and the cone angle can be fixed.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be secured by United States letters patent is:

1. In streamlining apparatus forwardly deployable from a vehicle, the improvement comprising: a stem having first and second ends; means for attaching the first end of the stem to a vehicle with the stem forwardly protrusive from the vehicle, a plurality of panels, means for holding the plurality of panels at the second end of the stem, at an angle thereto, and means for unfolding the plurality of panels into conical array for streamlining and for folding the plurality of panels into overlap position for storage.

2. In streamlining apparatus as recited in claim 1, the stem comprising telescoping structure, and means for extending and retracting the telescoping structure for said streamlining and storage respectively.

3. In streamlining apparatus as recited in claim 2, and means for altering said angle of the plurality of panels upon said extending and upon said retracting of the telescoping structure.

4. In streamlining apparatus as recited in claim 3, said overlap storage position being with the panels in bow-tie like configuration.

5. In streamlining apparatus as recited in claim 4, the telescoping structure comprising plural tubular members, and the means for extending and retracting including an arm axially within plural of said telescoping members.

6. In streamlining apparatus as recited in claim 5, the means for holding the plurality of panels including an end of said arm, and the means for unfolding comprising means for rotating the end of the arm.

7. In streamlining apparatus as recited in claim 6, the plurality of panels protruding through slot structure in a said tubular member.

8. In streamlining apparatus as recited in claim 6, the means for extending and retracting including an actuator having connection for moving said arm axially.

9. In streamlining apparatus as recited in claim 8, said a vehicle being of the type having windshield for an operator and a radiator below the windshield, and the improvement including said means for attaching having mounting for locating the stem between windshield and radiator of said a vehicle.

10. In streamlining apparatus as recited in claim 9, a portion of a tubular member located for passing into said a vehicle interior.

11. In streamlining apparatus as recited in claim 8, said a vehicle being of the type having a front bumper, and the improvement including the means for attaching located downward from the stem in position for front bumper attachment on said a vehicle.

12. In streamlining apparatus as recited in claim 11, at least one panel being transparent.

13. In streamlining apparatus as recited in claim 12, a windshield wiper assembly having a portion extending from the stem in position for wiping said at least one panel.

14. In streamlining apparatus as recited in claim 3, the means for altering said angle including brace structure, and means locating the brace structure on said retracting of the telescoping structure for contracting successively shorter panel radii.

15. In streamlining apparatus as recited in claim 14, the brace structure including a circular member, and means supporting the circular member to a said tubular member.

16. In streamlining apparatus as recited in claim 15, the supporting means including strut structure; a tubular member having a recess for receiving strut structure.

17. In streamlining apparatus as recited in claim 14, means for biasing the panels against the brace structure.

18. In streamlining apparatus as recited in claim 17, the biasing means including spring structure between the panels and brace structure.

19. In streamlining apparatus as recited in claim 18, the spring structure including a plurality of springs, a plurality of clips attaching respective springs of said plurality to respective successive panels, the clips on successive panels being successively located further from a portion of each panel a distance providing clip clearance with the panels in folded configuration.

20. In streamlining apparatus as recited in claim 3, each said panel having yielding structure permitting fore-and-aft motion thereof.

21. In streamlining apparatus as recited in claim 3, a pair of the panels being affixed in horizontal bow-tie configuration to a portion of the telescoping structure, and the folded position all said panels being at the affixed panels.

22. In streamlining apparatus as recited in claim 3, at least one of said panels being transparent, and windshield wiper on said telescoping structure in position for wiping said transparent panel.

23. In streamlining apparatus as recited in claim 3, said conical array being asymmetrically conical.

24. In streamlining apparatus as recited in claim 3, said conical array being asymmetrically angled with respect to the stem.

25. In streamlining apparatus as recited in claim 3, said conical array being convex.

* * * * *